Feb. 7, 1939. V. MANCINI 2,146,640
DISPENSING DEVICE
Filed Sept. 11, 1937
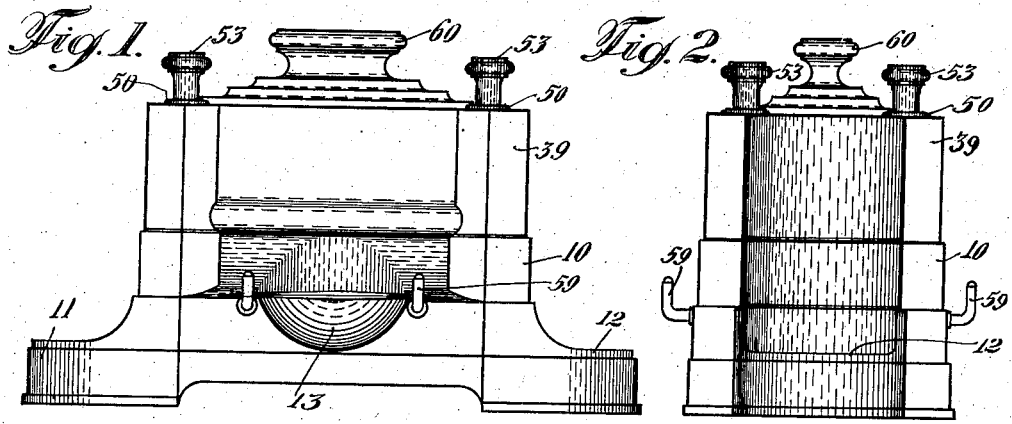
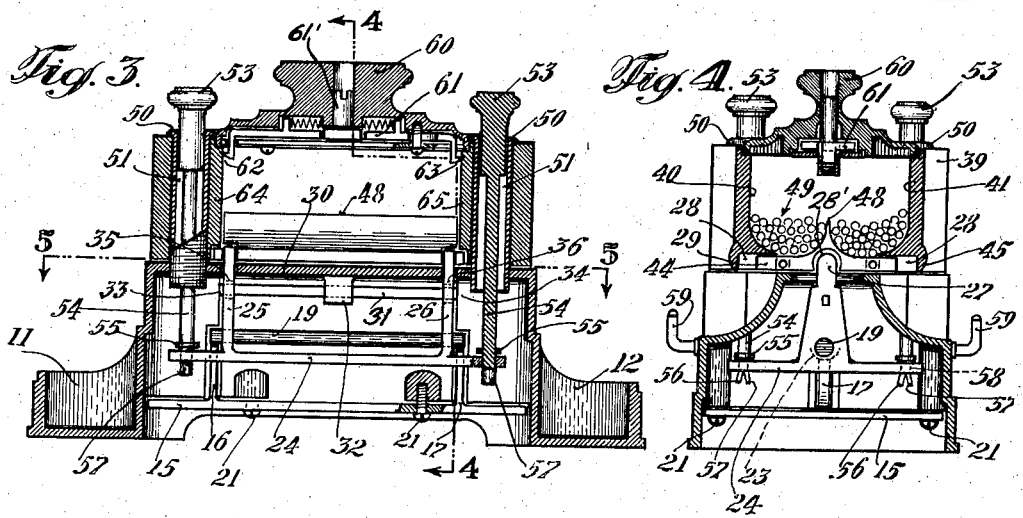
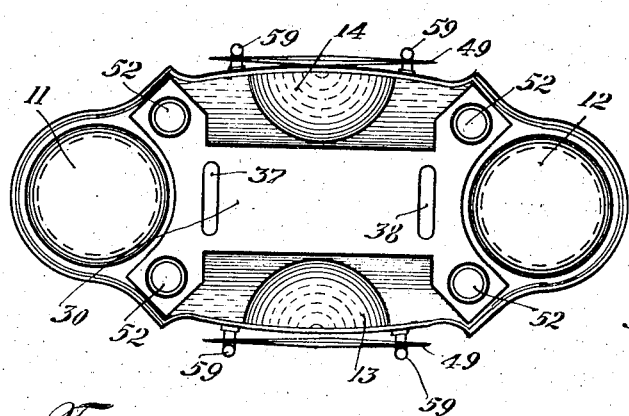
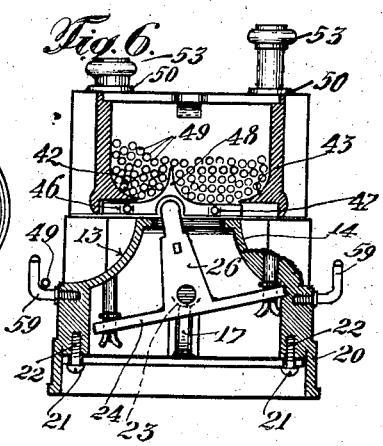
INVENTOR.
Vincenzo Mancini
BY Joseph F. Padlon
ATTORNEY.

Patented Feb. 7, 1939

2,146,640

UNITED STATES PATENT OFFICE 2,146,640

DISPENSING DEVICE

Vincenzo Mancini, Emerson, N. J., assignor of one-half to John J. Micele, New York, N. Y.

Application September 11, 1937, Serial No. 163,395

9 Claims. (Cl. 312—80)

This invention relates to a dispensing device. More particularly it relates to a device for holding a supply of useful articles; such as, matches, tooth picks, cigarettes and the like, and which upon actuation will dispense or eject one of the articles stored therein.

My invention contemplates the construction of a device in which the parts are so cooperatively disposed as to eject upon actuation any desired elongated article of cylindrical outline; stored singly or in batches in the device.

It contemplates other advantageous features of construction and objects which will be apparent from the following detailed description taken in connection with the accompanying drawing, in which—

Fig. 1 is a front elevation view of a preferred embodiment of my invention,

Fig. 2 is an end view of said preferred embodiment,

Fig. 3 is a sectional elevation view of said embodiment,

Fig. 4 is a sectional view taken on line 4—4 and looking in the direction of the arrows thereof in Fig. 3, Fig. 5 is a plan view of a section of the embodiment, and Fig. 6 is a sectional end view of the embodiment showing a tooth pick being ejected therefrom.

Referring now to the drawing, in which like numerals refer to like parts thruout in the preferred embodiment, a casing 10 is preferably provided having any suitable external appearance adapting it to rest on a flat surface such as a table or counter and the like. Said casing for purposes of illustration herein, is preferably rectangular shaped and is provided at its longer ends with a plurality of external recesses 11 and 12, respectively for holding salt and pepper shakers, not shown, comonly used at home or in restaurants. The front and rear of said casing are provided with inwardly curved walls forming finger recesses 13 and 14, respectively. Inside of said casing 10 is a plate member 15, provided with a pair of opposed, spaced, upwardly extending lugs 16 and 17 forming a fulcrum or support for a cross-bar member 19. Said member extends thru the major length of the casing and is adapted to fit therein against top walls 20. Said plate 15 is fixed to the lower portion of casing 10 by any suitable means such as set screws 21 extending therethru and into apertures 22 provided in the walls 20 of said casing, as shown.

It is to be noted that lugs 16 and 17 have cup shaped supporting ends 23 for accommodating cross-bar 19 without permitting dislocation of the same when in operation.

Pivoted to cross-bar 19 is a plate 24 made preferably of metal, and provided with a pair of opposed arms 25 and 26 respectively, extending upwardly therefrom into the casing. It is to be noted that bar 19 extends thru the arms at a position adjacent the plane of plate 24 to permit easy tilting of said plate. Furthermore, said arms are preferably disposed so that their middle line is coincidental with the plane of the plate. The upper ends of said arms are preferably tapered having a rounded terminal portion 27, adapted to fit into a grove 28' of a plate or slidable floor 29 which is slidable on the top wall 30 of casing 10. Said arms extend thru slots 37 and 38 of top wall 30. In order to return plate 24 into neutral from tilting position, I provide a spring plate member 31 fixed in a tongue 32 depending from and integral with the top wall 30 of casing 10. Said spring plate has its respective free ends 33 and 34 extending thru respective openings 35 and 36, in arms 25 and 26 thereby keeping plate 24 in a relatively horizontal position, as shown in Figs. 3 and 4. It is to be noted that said openings 35 and 36 are disposed in vertical alignment with the axis of cross-bar 19 to permit spring plate 31 to maintain the necessary equilibrium of plate 24.

Adapted to fit on the top of wall 30 of casing 10 is a rectangular shaped top section 39 with inner front and rear walls 40 and 41 having their respective terminal portions 42 and 43 curved toward the center of the section. Said terminal portions extend over the long ends of plate 29 and form reduced vertical ends 44 and 45 thereby leaving a clearance space between them and the long ends of plate 29. Said plate 29 has a plurality of parallel slots 46 and 47 respectively adjacent the long edges thereof, to catch any article of a cylindrical nature therein. Furthermore, the plate 29 has a peaked edge 48 running along its mid-section and above the groove 28, thus dividing the interior of section 39 into two parts for retaining any suitable cylindrical or like article. In the present case, I show for purposes of illustration, a plurality of tooth-picks 49 inside the section and lying on top of the plate 29.

By referring to Figs. 4 and 6, it will be noted that slots 46 and 47 each hold a toothpick. In Fig. 4, the plate resting against top wall 30 does not permit the tooth-picks to slide out of the slots until it is properly actuated as will be hereinafter described.

Said top section 39 is fixed to wall 30 of casing 10 by means of a plurality of externally threaded bushings 50 extending from openings 51 of the section 39 into openings 52 of the casing 10. It is to be noted that the top wall at openings 52 is threaded to retain the bushings and that the later are flanged at their upper exposed end thereby forming contact with the roof of top section 39 at the openings thereof to keep the same in engagement with the casing.

In order to actuate plate 29 there are provided a plurality of depressing rods 53 which are adapted to fit into bushings 50 and form a loose engagement with plate 24. It is to be noted that each of the terminal portions 54 of rods 53 is provided with a washer 55 fixed thereto above plate 24 while its end is provided with bifurcations 56 and 57. These bifurcations are passed thru respective openings 58 disposed in the plate 29 in alignment with the rods 53 and spread apart as shown in the drawing. Said depressing rods are disposed to operate in pairs altho I am not limited to such number, in order to produce the desired results. If it is desired to operate the device all that is necessary is to depress one of the rods 53 in which case plate 24 is tilted on its pivot in the direction of the rod as shown in Fig. 6, whereupon plate 29 is slid over to the side of the depressed rod until slot 46 therein clears the top wall 30, thereby permitting the tooth-pick 49 in slot 46 to fall out onto the holders 59 and projecting outwardly of casing 10 and adjacent recess 13 or 14 thereof. It will be noted that the curved end 42 of wall 40 covers the slot 46 when the plate 29 is slid over to the left as shown in Fig. 6, thereby preventing any more of the tooth-picks to slide out. Also, the peaked edge 48 of plate 29 is so elevated as to form two piles of the articles in the space of top section 39 and thereby permit even distribution of said articles.

After pressure is released on one pair of rods 53, spring plate 31 being under tension actuates the plate 24 into neutral position thereby carrying with it plate 2 until slots 46 and 47 therein are above wall 30 of casing 10. Each pair of rods can be alternately depressed so that an article can be alternately rejected from each adjacent recess 13 or 14.

The top section is provided with a closure member 60 of any suitable outward design adapted to fit thereinto and enclose the articles contained in the section. Said closure member is provided with a small slotted turntable rod 61' connected with a locking device 61 of the usual leverage spring type by means of which they engage grooves 62 and 63 in walls 64 and 65 respectively. When a key usually of a flat type is inserted into the slotted end of the rod 61' and turned the members 61 are forced outwards to engage the grooves 62 and 63 respectively. By reversing this motion the members 61 are withdrawn from the grooves thereby permitting removal of the closure member 60.

From the foregoing description taken in connection with the accompanying drawing, a preferred embodiment of my invention has been described by which any article of suitable shape is ejected therefrom as needed. Furthermore, the novel cooperation of the parts therein permit the alternate escape of articles therefrom with little effort. Also, all parts may be easily cast, molded or punch pressed and may be of metal or other suitable material as Bakelite.

My device is found suitable for use in dispensing cigars, cigarettes, matches, tooth-picks, pencils and other articles of a similar type and is used also in connection with devices where a coin is inserted to release one of the articles.

While one preferred embodiment of my invention has been shown and described, it is to be understood that changes as to materials and arrangement of parts, may be made without departing from the scope of my invention.

I claim:

1. A dispensing device, comprising a casing having a slotted top, a pivoted cross bar mounted in the casing, means supporting said cross bar, a tiltable member mounted on said cross bar having a pair of opposed arms extending upwardly thru the slotted top of the casing, slidable longitudinally slotted means mounted on the casing pivoted to said arms adapted for carrying an article in the slotted portion thereof, said means being actuable by said tiltable member, and a plurality of spaced depressible means extending through the casing in connection with the member for rocking the same on said cross bar and actuating the slidable means across the edge of the casing to thus permit the dropping of an article carried by the slidable means.

2. A device for dispensing articles of cylindrical or like outline, comprising a casing having a plurality of opposed slots on the top thereof, a tiltable member pivoted to a plurality of opposed walls of the casing and having a plurality of opposed arms extending thru the slots of the casing, said member being disposed in a normally horizontal position in the casing, a horizontally slidable carrier on top of the casing in pivotal connection with the arms of the tiltable member, adapted to be moved thereby to a position beyond either side of a pair of opposed walls of the casing, and having a slot adjacent each of the edges adapted to be passed beyond the walls of the casing to permit an article it may be carrying to fall therefrom, a container fixed to the casing having a pair of opposed walls with terminating portions curved over said edges of the carrier when in non-operative position, said container being adapted to retain articles of cylindrical outline therein, yieldable means in the casing for normally returning the tiltable member to a horizontal position, means extending thru the container and the casing in connection with the tiltable member for actuating the same, and a closure member for covering said container and locking the contents therein.

3. A device for dispensing toothpicks and the like therefrom, comprising a casing, supporting means inside the casing in connection therewith, a tiltable member pivoted onto said supporting means, having a pair of oppositely spaced arms extending through the top of said casing, said top having a pair of slots to permit movement of said arms therein, a slidable carrier on top of the casing pivoted to the arms and adapted to be alternately moved across from beyond one edge to the other edge of the casing, said carrier having a middle peaked edge on one face thereof, a container for the carrier fixed to the top of the casing for retaining a batch of toothpicks in substantially two piles, said carrier forming the floor of the container and being provided with a longitudinal slot adjacent each of opposite edges thereof, for holding a toothpick therein, and a pair of actuable members extending through the container and the casing, in connection with the tiltable member for rocking the same from one side to the other on its pivot in the casing and thereby slide the carrier from one adjacent edge of the casing to the other and permit a toothpick to fall from the carrier, and a closure member for the top of the container.

4. A device according to claim 3 in which a spring plate is fixed to the casing and extends thru the arms of said tiltable member for returning the same into a normally fixed neutral position after it is rocked from one side to the other in the casing, to prevent passage of toothpicks thru the slots of the carrier.

5. A dispensing device for cylinder like articles comprising a base having a slotted top, a rockable member axially pivoted on said base having a plurality of upwardly extending arms movable thru said slotted top, a container for said articles fixed to said base having a slidable floor over said top of the base in connection with said arms, said floor being actuable by the arms of the member, and having a plurality of marginally disposed longitudinal spaced slots for holding articles therein, a closure member for said container, manually depressible means in connection with the rockable member for tilting the same on its longitudinal axis to permit the floor to slide sufficiently past one edge of the base and permit escape of the article in one of the slots and then from the other slot, and means in connection with the base extending thru the arms for normally returning the rockable member to rest position.

6. A device according to claim 5, in which a pair of walls of the container at their terminal portions is curved toward the center of the container to normally cover the slots of the floor, when in normal rest position, said floor being provided with a longitudinal middle peaked edge to divide the articles in the container into two batches therein.

7. A dispensing device for cylindrical and similar articles comprising a casing having a plurality of slots in the top thereof, means fixed in the casing having a pair of spaced, opposed supporting members, a plate member pivotally mounted on said supporting members said plate member having a pair of spaced, opposed arms extending thru said slots in said casing, a container for said articles fixed to the top of the casing, having a pair of opposed inner walls with the lower portions terminating in a curve toward the center of the casing, a floor abutting the top of the casing in connection with the arms movable in said container towards and away alternately from said walls and having a plurality of parallel slots each adjacent a marginal edge of the floor and adapted for carrying an article, said floor forming a closure with said casing when it is in neutral position, spring plate means in the casing in contact with the arms for normally reverting the plate member to neutral position, and a plurality of means for tilting said plate member to actuate the floor of the container until one of its slots is passed beyond the corresponding edge of the casing to permit escape of the article in the slot.

8. A device for dispensing articles of cylindrical or like outline comprising a casing having a flat top thereon, a rockable member pivotally mounted in said casing, a plurality of means extending from the member thru the top of the casing, a slidable floor pivoted to the means and mounted above the top of the casing and adapted to be slid back and forth thereon by said means from a central position whereby alternate edges of the floor will overlap alternate walls of the casing, said floor having a plurality of slots for carrying articles therein, a container in connection with the casing for said articles, having said slidable floor intermediate the top of the casing and container, and depressible means extending thru the casing and container for tilting the rockable member to slide the floor from a central position to a position for alternately overlapping the adjacent walls of the casing whereby a cylindrical article will fall from one of the slots when its adjacent edge overlaps the wall of the casing.

9. A device for dispensing articles of cylindrical or like shape, comprising a casing having a slotted top portion, a plate member pivoted to a pair of opposed walls in the casing and rockable in said casing, a slidable carrier on top of the casing having a plurality of parallel, longitudinal slots adjacent the marginal edges thereof adapted to carry articles therein, a plurality of opposed means extending thru the slotted portion of the casing interconnecting the plate member of the carrier, said carrier being actuable by the opposed means past alternate edges of the top portion of the casing to permit the falling of the articles from the slots when they are beyond the edges of the top of the casing, a container for the articles, mounted on the casing and surrounding the carrier, said carrier forming a movable floor of the casing, plunging means extending thru the casing and container in connection with the plate member for tilting the same on its pivot, yieldable means fixed across the opposed walls in the casing for normally returning the tiltable member to a rest position, and closure means for the container.

VINCENZO MANCINI.